(12) United States Patent
Chisholm et al.

(10) Patent No.: US 10,360,309 B2
(45) Date of Patent: Jul. 23, 2019

(54) CALL CENTER SMS-MMS LANGUAGE ROUTER

(71) Applicant: HeyWire, Inc., Cambridge, MA (US)

(72) Inventors: Thomas Brett Chisholm, Lexington, MA (US); James Hunt, Florham Park, NJ (US); Eugene Lee Lew, Olney, MD (US)

(73) Assignee: SALESFORCE.COM, INC., San Francisco, CA (US)

(*) Notice: Subject to any disclaimer, the term of this patent is extended or adjusted under 35 U.S.C. 154(b) by 0 days.

(21) Appl. No.: 14/700,339

(22) Filed: Apr. 30, 2015

(65) Prior Publication Data

US 2016/0321245 A1 Nov. 3, 2016

(51) Int. Cl.
H04M 3/51 (2006.01)
H04W 4/14 (2009.01)
G06F 17/27 (2006.01)
G06F 17/28 (2006.01)
H04M 3/523 (2006.01)
H04M 3/42 (2006.01)

(52) U.S. Cl.
CPC .......... *G06F 17/289* (2013.01); *G06F 17/275* (2013.01); *G06F 17/2705* (2013.01); *H04M 3/5141* (2013.01); *H04W 4/14* (2013.01); *H04M 3/42382* (2013.01); *H04M 3/523* (2013.01); *H04M 2203/2061* (2013.01); *H04M 2242/12* (2013.01); *H04M 2250/58* (2013.01)

(58) Field of Classification Search
None
See application file for complete search history.

(56) References Cited

U.S. PATENT DOCUMENTS

| 6,415,250 B1 * | 7/2002 | van den Akker ... G06F 17/2715 704/9 |
| 6,449,483 B1 | 9/2002 | Akhteruzzaman et al. |
| 6,591,103 B1 | 7/2003 | Dunn et al. |
| 6,690,932 B1 | 2/2004 | Barnier et al. |

(Continued)

FOREIGN PATENT DOCUMENTS

| GB | 2397730 B | 6/2006 |
| GB | 2431820 A | 5/2007 |
| WO | 2007015075 | 2/2007 |

OTHER PUBLICATIONS

European Search Report for corresponding European application No. 09805443.0, dated Dec. 11, 2013, total pp. 8.

(Continued)

*Primary Examiner* — Mohamed A Kamara
*Assistant Examiner* — Saad Khawar
(74) *Attorney, Agent, or Firm* — Morris & Kamlay LLP

(57) ABSTRACT

A method and system enables language translation and routing of Person-to-Person (P2P) messages. Customer messages are diverted to various alternate destinations in an enterprise based on the language of the messages. Enterprise alternate destinations include language capable call center customer service representatives (CSRs), language specialized call centers, and personnel in various departments in an enterprise having language skills. The CSRs and other personnel can communicate through the call centers or using data enabled devices. Information collected from the messages can be used to determine the appropriate destination.

13 Claims, 6 Drawing Sheets

(56) References Cited

U.S. PATENT DOCUMENTS

| | | |
|---|---|---|
| 6,757,365 B1 | 6/2004 | Bogard |
| 7,002,970 B1 | 2/2006 | Veschi |
| 7,010,312 B1 | 3/2006 | Zechlin |
| 7,197,035 B2 | 3/2007 | Asano |
| 7,263,076 B1 | 8/2007 | Leibovitz et al. |
| 7,275,104 B1 | 9/2007 | Martinez et al. |
| 7,343,168 B2 | 3/2008 | Valloppillil |
| 7,380,022 B2 | 5/2008 | Tell et al. |
| 7,446,655 B2 | 11/2008 | Jha et al. |
| 7,499,704 B1 | 3/2009 | Bonner |
| 7,564,958 B1 | 7/2009 | Contractor |
| 7,606,568 B2 | 10/2009 | Gallagher et al. |
| 7,693,535 B2 | 4/2010 | Dunko |
| 7,716,297 B1 | 5/2010 | Wittel et al. |
| 7,734,908 B1 | 6/2010 | Kung et al. |
| 7,860,525 B2 | 12/2010 | Parkkinen et al. |
| 7,865,198 B2 | 1/2011 | Shin |
| 7,940,896 B2 | 5/2011 | Prozeniuk et al. |
| 8,463,304 B2 | 6/2013 | Lauer et al. |
| 8,520,833 B1 | 8/2013 | Pettay et al. |
| 8,561,118 B2 | 10/2013 | Flynn-Ripley et al. |
| 8,570,906 B1 | 10/2013 | Croak et al. |
| 8,578,261 B1 | 11/2013 | Gupta et al. |
| 8,694,031 B2 | 4/2014 | Lew et al. |
| 8,788,599 B2 | 7/2014 | Harju et al. |
| 8,890,685 B1 | 11/2014 | Sookman et al. |
| 8,918,085 B2 | 12/2014 | Lew et al. |
| 8,989,712 B2 | 3/2015 | Doulton |
| 8,989,713 B2 | 3/2015 | Doulton |
| 9,271,129 B2 | 2/2016 | Lew et al. |
| 9,286,378 B1 | 3/2016 | Larakhovsky et al. |
| 9,356,907 B2 | 5/2016 | Lew et al. |
| 9,456,317 B2 | 9/2016 | Kornafeld |
| 9,710,982 B2 | 7/2017 | Matthews, III et al. |
| 2003/0101244 A1 | 5/2003 | Lockridge et al. |
| 2003/0185379 A1 | 10/2003 | OConnor et al. |
| 2003/0232623 A1 | 12/2003 | Balasuriya et al. |
| 2004/0076144 A1 | 4/2004 | Ishodoshiro |
| 2004/0109452 A1 | 6/2004 | Takihiro et al. |
| 2004/0137923 A1 | 7/2004 | Lang |
| 2005/0032518 A1 | 2/2005 | Rajan |
| 2005/0148353 A1 | 7/2005 | Hicks et al. |
| 2005/0149335 A1 | 7/2005 | Mesbah et al. |
| 2005/0181805 A1 | 8/2005 | Gallagher |
| 2005/0233733 A1 | 10/2005 | Roundtree et al. |
| 2005/0277407 A1 | 12/2005 | Ahn et al. |
| 2005/0288045 A1 | 12/2005 | Yang et al. |
| 2006/0025173 A1* | 2/2006 | Kamdar ............ H04M 3/42357 455/556.1 |
| 2006/0074628 A1* | 4/2006 | Elbaz .................. G06F 17/273 704/8 |
| 2006/0075052 A1 | 4/2006 | Oostendorp |
| 2006/0123360 A1 | 6/2006 | Anwar et al. |
| 2006/0142012 A1 | 6/2006 | Kirchhoff et al. |
| 2006/0148495 A1 | 7/2006 | Wilson |
| 2006/0259473 A1 | 11/2006 | Li et al. |
| 2007/0026901 A1 | 2/2007 | McKay |
| 2007/0032225 A1 | 2/2007 | Konicek et al. |
| 2007/0066318 A1 | 3/2007 | Danzeisen et al. |
| 2007/0073585 A1 | 3/2007 | Apple et al. |
| 2007/0082664 A1 | 4/2007 | Landschaft et al. |
| 2007/0167178 A1* | 7/2007 | Al-Harbi ............ G06Q 10/02 455/466 |
| 2007/0190978 A1 | 8/2007 | White et al. |
| 2007/0203850 A1 | 8/2007 | Singh et al. |
| 2008/0032679 A1* | 2/2008 | Purontaus ............ H04M 3/436 455/417 |
| 2008/0037456 A1 | 2/2008 | Chen |
| 2008/0043969 A1 | 2/2008 | Shi |
| 2008/0045250 A1* | 2/2008 | Hwang ................ H04W 4/14 455/466 |
| 2008/0096588 A1 | 4/2008 | Waytena et al. |
| 2008/0114862 A1 | 5/2008 | Moghaddam |
| 2008/0140850 A1 | 6/2008 | Gade et al. |
| 2008/0172496 A1 | 7/2008 | Middleton et al. |
| 2008/0182563 A1 | 7/2008 | Wugofski et al. |
| 2008/0192908 A1* | 8/2008 | O'Keefe ............ H04M 3/5191 379/93.17 |
| 2008/0198987 A1 | 8/2008 | Daly |
| 2008/0263137 A1 | 10/2008 | Pattison et al. |
| 2008/0270556 A1 | 10/2008 | Bamford |
| 2008/0293404 A1 | 11/2008 | Scherzer et al. |
| 2009/0003312 A1 | 1/2009 | Velazquez et al. |
| 2009/0005005 A1 | 1/2009 | Forstall et al. |
| 2009/0017789 A1 | 1/2009 | Thomas et al. |
| 2009/0031232 A1 | 1/2009 | Brezina et al. |
| 2009/0063280 A1 | 3/2009 | Wurster et al. |
| 2009/0154434 A1 | 6/2009 | Tanaka et al. |
| 2009/0156179 A1 | 6/2009 | Hahn et al. |
| 2009/0156202 A1 | 6/2009 | Reiss et al. |
| 2009/0164564 A1 | 6/2009 | Willis |
| 2009/0186634 A1 | 7/2009 | Sureka |
| 2009/0201916 A1 | 8/2009 | Caron et al. |
| 2009/0249478 A1 | 10/2009 | Rosener et al. |
| 2009/0319914 A1 | 12/2009 | Roseway et al. |
| 2010/0029273 A1 | 2/2010 | Bennett |
| 2010/0035640 A1 | 2/2010 | Lew et al. |
| 2010/0037277 A1 | 2/2010 | Flynn-Ripley et al. |
| 2010/0124905 A1 | 5/2010 | Pratt et al. |
| 2010/0161722 A1 | 6/2010 | Jeon et al. |
| 2010/0262668 A1* | 10/2010 | Piett ................ H04W 4/90 709/206 |
| 2010/0287215 A1* | 11/2010 | Lasensky ............... G06Q 10/06 707/805 |
| 2011/0045828 A1 | 2/2011 | Madan et al. |
| 2011/0070868 A1 | 3/2011 | Scholz et al. |
| 2011/0142211 A1 | 6/2011 | Maes |
| 2011/0195722 A1 | 8/2011 | Walter et al. |
| 2011/0238766 A1 | 9/2011 | Lew et al. |
| 2012/0165048 A1* | 6/2012 | Zhu .................. G06F 17/289 455/466 |
| 2012/0221962 A1 | 8/2012 | Lew et al. |
| 2012/0226759 A1 | 9/2012 | Lew et al. |
| 2013/0078990 A1 | 3/2013 | Kim et al. |
| 2013/0080898 A1 | 3/2013 | Lavian et al. |
| 2013/0194135 A1 | 8/2013 | Farnham |
| 2013/0196697 A1 | 8/2013 | Lew et al. |
| 2013/0219262 A1 | 8/2013 | Becker et al. |
| 2013/0252649 A1* | 9/2013 | Siomina ................ H04W 4/02 455/466 |
| 2013/0298037 A1 | 11/2013 | Matthews et al. |
| 2013/0310089 A1 | 11/2013 | Gianoukos et al. |
| 2014/0106701 A1 | 4/2014 | Silver et al. |
| 2014/0143435 A1 | 5/2014 | Jung et al. |
| 2014/0179260 A1* | 6/2014 | Malin ..................... H04W 4/90 455/404.2 |
| 2014/0198796 A1 | 7/2014 | Lew et al. |
| 2014/0269679 A1 | 9/2014 | Gillis et al. |
| 2014/0364082 A1 | 12/2014 | Baddeley et al. |
| 2015/0082198 A1 | 3/2015 | Destagnol et al. |
| 2015/0113082 A1 | 4/2015 | Lew et al. |
| 2015/0143224 A1 | 5/2015 | Kennedy |
| 2015/0149560 A1* | 5/2015 | Lee ..................... H04L 51/066 709/206 |
| 2015/0223271 A1 | 8/2015 | Penix et al. |
| 2016/0135020 A1* | 5/2016 | Moshir ............... H04L 63/0428 455/466 |
| 2017/0006161 A9* | 1/2017 | Riahi .................. G06Q 30/02 |

OTHER PUBLICATIONS

International Search Report and Written Opinion dated Dec. 7, 2011 in corresponding International Application No. PCT/US2011/037190.

International Search Report for International Application No. PCT/US2009/052715 dated Sep. 24, 2009.

International Search Report and the Written Opinion for International Application No. PCT/US2016/029667, 3 Pages, dated Aug. 5, 2016.

(56) References Cited

OTHER PUBLICATIONS

International Search Report and the Written Opinion for International Application No. PCT/US2016/029665, 5 Pages, dated Aug. 11, 2016.
International Search Report, PCT/US2016/029667, dated Aug. 5, 2016, pp. 3.

* cited by examiner

CALL CENTER SMS-MMS LANGUAGE ROUTER

CROSS REFERENCE TO RELATED APPLICATIONS

This application is related to United States Patent Application having Ser. No. 13/803,331 entitled "MOBILE MESSAGE ENABLING ENTERPRISE OFFICE TELEPHONE NUMBERS," filed Mar. 14, 2013 and United States Patent Application having Ser. No. 14/453143 entitled "CALL CENTER MOBILE MESSAGING," filed Aug. 6, 2014. This application is also related to United States Patent Application entitled "CALL CENTER A2P-TO-P2P MESSAGE ROUTING CONVERSION," filed on an even date herewith. The entire teachings and contents of these Patent Applications are hereby incorporated by reference herein in their entireties.

FIELD OF THE INVENTION

The present invention relates to Person-to-Person (P2P) messaging, call center operations, language translation and routing and enterprise communications with customer mobile devices.

BACKGROUND

Conventional Person to Person (P2P) messaging includes messaging between two mobile subscribers. Often a customer would like to contact a call center using messaging communications. One challenge is a language barrier when a customer contacts a call center with an SMS or MMS message in a language other than primary language of the call center staff. In this case, the message cannot be read or understood. For example, a message comes into the call center in Spanish, but majority of customer service representatives (CSRs) are conversant in English only. In this case the call center misses an opportunity to service a customer through the customer's selected means of communication.

SUMMARY OF THE INVENTION

Methods and devices disclosed herein enable recognition of a language in a message directed to a call center and if the language is a foreign language with respect to the native language of the call center, the message can be automatically forwarded to a customer service representative (CSR) or other person capable of reading, understanding the message and replying to the message. Auto-response to an incoming message acknowledging the incoming message in its native language can also be provided. In one embodiment a call center is SMS/MMS enabled, to receive messages in various foreign languages. In another embodiment, the message is translated either automatically or manually and sent to a CSR.

These features are achieved in accordance with one embodiment by a method including: determining a language capability of enterprise call center and provisioning at least one alternate destination device by registering the at least one alternate destination device in a messaging hub and associating the at least one alternate destination device with associating the at least one alternate destination device with the enterprise call center and language capability. The method further includes establishing a connection between the messaging hub and a message interface, receiving a message directed to the enterprise call center, receiving a message directed to the enterprise, determining the language of the message, determining an alternate destination for the message and diverting the message to the at least one alternate destination. The message interface can be an SMS interface including at least one of an SMS/MMS Gateway, an IP messaging Gateway or a short message service center/multimedia message service center (SMSC/MMSC).

Such a method enables the automatic recognition of messages in foreign languages and routing, to an appropriate machine or person able to understand and interpret the message in the foreign language. In one embodiment, an auto-response acknowledgement of receipt of the message is sent.

In another embodiment, one alternate destination for the message is a language translator and the technique further comprises translating the message and sending the message to a default destination. In a further embodiment, one alternate destination is a call center and the technique further comprises establishing a secure connection between the messaging hub and a call center interface. In yet another embodiment, the alternate destination is a data enabled device and the technique further comprises establishing a secure IP connection between the messaging hub and the data enabled device. The message interface is an SMS interface includes, but is not limited to an SMS/MMS Gateway, an IP messaging Gateway and an SMSC/MMSC.

In another embodiment, determining the language of the message includes determining that the message is in a foreign language and parsing a predetermined number of words to provide input into a language database for identification of the language. In still another embodiment, determining that the message is in a foreign language and identifying the language includes analyzing a character set of text in the message. In another embodiment, determining an alternate destination for the message includes comparing the language capability of an enterprise call center with the determined language of the message.

In another embodiment, determining an alternate destination for the message includes determining a geographical origin of the message and determining the alternate destination based on the geographical origin of the message. In another embodiment, the message is an SMS message or an MMS message.

A messaging hub for routing a foreign language message includes a server connected to a message interface, a database running on the server for registering at least one data enabled device and the language capability of an enterprise call center, an incoming message queue for storing a message and a diverter for directing the message to the at least one data enabled device as an alternate destination for the message. The messaging hub diverter can further include a message language scanner coupled to the incoming message queue.

A non-transitory computer readable storage medium includes executable instructions, which when executed by a computer, cause the computer to: determine a language capability of call center and provision at least one alternate destination device. The provisioning includes registering the at least one alternate destination in the messaging hub and associating the at least one alternate destination with the enterprise call center and a language capability. The computer further establishes a connection between the messaging hub and a message interface, receives a message directed to the enterprise, determines the language of the message, determines an alternate destination for the message and diverts the message to the at least one alternate destination.

It is to be understood that the features of the messaging hub and call center can be embodied strictly as a software program, as software and hardware, or as hardware alone such as within a single processor or multiple processors, or within an operating system or within a software application.

Other embodiments of the invention that are disclosed herein include software programs to perform the steps and operations summarized above and disclosed in detail below. One such embodiment comprises a computer program product that has a non-transitory computer readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. Other configurations include web applications, browsers, IP applications and data enabled device applications as will be explained in more detail.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention. These and other features of the invention will be understood from the description and claims herein, taken together with the drawings of illustrative embodiments, wherein

DETAILED DESCRIPTION

In an exemplary embodiment, a message sent by a customer using a language which is foreign to a call center can be diverted/redirected to an alternate destination that is enabled to more efficiently handle the foreign language instead of just deleting or ignoring the reply. The alternate destination can be an enterprise's call center for handling the reply or possibly an enterprise department which is suited to handle the reply. Alternatively the message is translated and forwarded onto the call center with an indication that follow-on messages may need special handling.

In one embodiment, such features are facilitated by a messaging hub which manages the P2P DID and 800 number traffic of the enterprise and messages directed to the call center. In certain embodiments the messaging hub facilitates SMS communications between consumers and call centers and other departments within an enterprise.

Figure 1:
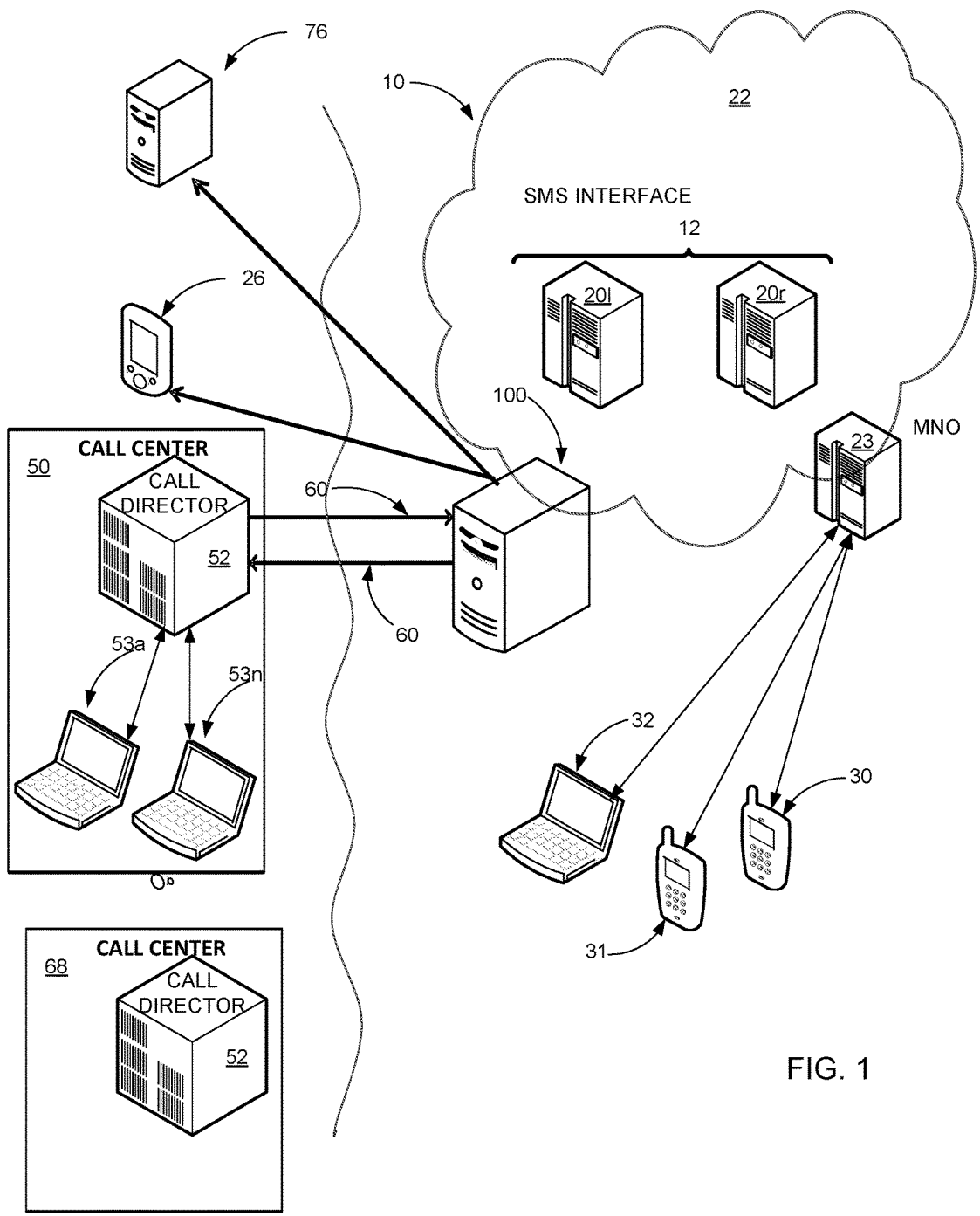
FIG. 1 is a schematic illustration of a messaging hub, a call center, an A2P application, operating in a mobile network environment/messaging infrastructure to communicate with customers in accordance with embodiments disclosed herein.

Now referring to FIG. 1, an exemplary messaging hub 100 operates in network environment 10 and relays messages between employee devices 26 (also referred to as data enabled device, registered alternate destination device), a call center 50 and customer devices 30 (also referred to as customer mobile phone). Other Employee devices include, for example, a mobile phone 30, a smartphone 31 a laptop 32 and other data enabled devices (not shown) such as a netbook and a tablet. Customer devices include, for example, a mobile phone 30, a smartphone 31 a laptop 32 and other data enabled devices (not shown) such as a netbook and a tablet.

The messaging hub 100 can communicate with customer devices 30 through a mobile network operator (MNO) 23 via an SMS interface 20l (local to messaging hub 100) and SMS interface 20r (remote from messaging hub 100). The SMS interface can include interconnected systems such as short message service center/multimedia message service center (SMSC/MMSC) both local and remote, SMS/MMS Gateways and IP messaging Gateways. The SMS interface 12 is a network element in the network environment 10. One of the SMS interface's 12 purposes is to store, forward, convert and deliver SMS/MMS messages to the MNO 23 and messaging hub 100. The link between the messaging hub 100 and the global messaging infrastructure 22 and the link between the messaging hub 100 and the call center 50 can be secured by the firewall 102 using a virtual private network (VPN) secure IP connection with HTTPS using 128-bit or higher encryption, for example, 1024 bit (3DES-SHA1) encryption. The messaging hub 100 can optionally communicate with a translator 76 (e.g., a machine translation service). It is understood that the functions of the translator 76 can be incorporated into the messaging hub 100.

In operation, the messaging hub 100 in one embodiment provisions the call center 50, an alternative call center 68 and the employee devices 26 as alternate destinations for messages addressed. The messaging hub 100 also establishes a secure connection to the SMS interface 12 to send and receive SMS messages which are processed by MNO 23. The provisioning process is described in more detail below in conjunction with FIG. 3.

After provisioning, the messaging hub 100 receives a message from the customer device 30 in response to a query by a customer. After receiving the message, the messaging hub 100 determines whether the message is a foreign language and if so either diverts the message to an alternate destination which can handle the foreign language or translates the message and then forwards the message to the call center 50.

The messaging hub 100 communicates with the call center 50, in one embodiment, over a secure connection 60 (e.g., a VPN connection). The call center 50 generally includes a call director 52 or alternatively other systems for dispatching customer call to CSRs. The call center generally includes multiple workstations 53a-53n for use by the CSRs (collectively referred to as CSR workstation 53). In one embodiment, the messaging hub 100 and call center 50 communicate data, language capabilities, number provisioning information, messages and message thread information over the secure connection 60.

Figure 2:
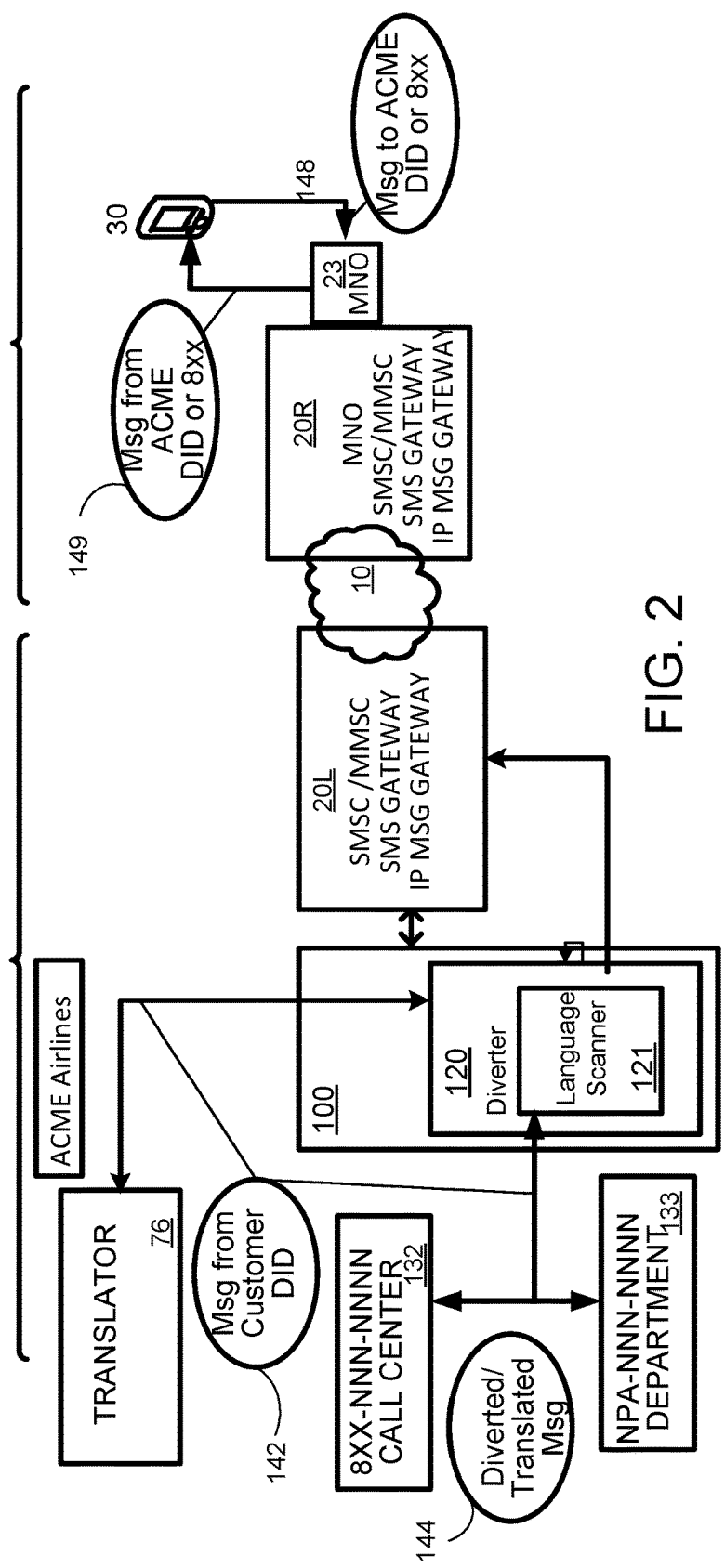
FIG. 2 illustrates details of an embodiment of the messaging hub of FIG. 1 including details of language translation and routing of P2P conversations after receiving a message from a customer.

Now referring to FIG. 2, the exemplary messaging hub 100 operates in the network environment 10 which includes global messaging infrastructure 22 with local SMS interface 201 and remote SMS interface 20r, here SMS gateways. The messaging hub 100 further includes the diverter 120 which includes a language scanner 121. FIG. 2 illustrates the processing of message 148 sent to an enterprise, here "ACME Airlines." The message 148 from a customer using the customer device 30 which may be in a foreign language is sent through mobile network operator (MNO) 23, a remote SMS interface 20r, the network 10, the local SMS interface 201 and received and processed by the messaging hub 100. It is understood that functionality of components in the local SMS interface 201 and remote SMS interface 20r and network 10 can be combined in various ways. Here, a passenger/customer can send message, for example, requesting flight information in a language different from the language used in the call center. The message 148 is initially delivered to the messaging hub 100. Instead of immediately forwarding the message 148, the message 148 is processed by the diverter 120 and the language scanner 121 to determine if the message is in a foreign language.

If it is determined that the message 148 is in a foreign language, the message 148 can be sent as a diverted message 144 to one of several alternate destinations including the call center 50, a department 133 associated with a registered alternate destination device 26 equipped to handle the foreign language, an alternate call center equipped to handle the foreign language, another registered alternate destination employee device 26 reached through the SMS interface 20. Alternatively, the message 148 can be sent as a message 142 to a translator 76. Thus the messaging hub 100 provides the ability to have two-way, one-to-one communication responding to a message in a foreign language.

The language scanner 121 scans the message 148 to determine if it is in a foreign language and the diverter decides which alternative destination should be used for diverting the message 148. In addition to scanning the message 148 text, the language scanner 121 can also scan the message 148 to determine a geographical origin of the message 148 to use in the language determination, translation and routing process. The diverter can then select the alternate destination based on language detection and parameters such as the geographical origin.

For example, based on an origin phone number from a country different from the enterprise call center the message 148 could be diverted (if found to be in a foreign language) to a different call center which has the capability of processing messages in that language. The message 148 can be diverted to a telephone number, a Customer Relationship Management (CRM) system, a non-telephone related messaging system or a call center depending on the language. The CRM, non-telephone related messaging system and call center can be integrated into the CRM and connected to the messaging hub 100.

If the messaging hub 100 determines that the message 148 includes words in a foreign language and there is no available call center or other alternate destination to process the message 148, the messaging hub 100 communicates with a translator 76 to translate the message. The translated message 144 can then be delivered to the call center 50 or alternate destination 133 as described below in further detail.

At the call center 50, the call director 52 can direct the translated or diverted message 144 to an assigned CSR (if translated) or to a CSR having the appropriate language skills. The call director 52 has the ability in conjunction with the messaging hub 100 to maintain the integrity of a customer query. In one embodiment, a graphical user interface running on the CSR workstation 53 allows the CSR to receive and compose SMS messages and to view or listen to multimedia attachments.

In one embodiment, the language scanner 121 is implemented as a 'rules processor.' It is supplied with relevant key words and phrases of interest which might be included in the SMS/MMS messages transmitted to and received from customers, and if there's a match, process an action which possibly leads to an alternative destination determination. In a specific embodiment the language scanner 121 is implemented as a dynamic IF-THEN-ELSE machine which can re-route a message, dump/trash a message or change priority of a message.

In one embodiment the following rules are used to process the message 148:

If the message is in native language of the call center, pass the message onto standard queues for processing by call center;

If the message is not in native language of the call center, parse several (e.g., a predetermined number) of words to provide input into a language database for identification of language;

Upon determination of language of message body, determine if the call center 50 has agents capable of reading/understanding the identified foreign language;

If the call center has a CSR fluent or conversant in the identified foreign language, forward the message to a specific queues (e.g., Spanish, Chinese, Hebrew, Arabic, Hindu, French, etc.) to be handled by the identified CSR;

If no available staff is fluent or conversant in the identified foreign language, copy entire SMS/MMS foreign language text body and input to a translator for translation to native language of call center staff;

Upon completion of translation, copy translated text to a message (replacing or appending to original foreign language text for forwarding to call center CSR for processing; and optionally generate an acknowledgement message in the customer's foreign language and send if desired by the Enterprise for acknowledgement purposes.

Alternatively, the message can be forwarded to a non-call center telephone number (e.g., a department in the enterprise which has foreign language skill to handle the message 148).

To continue the P2P conversation, the CSR can reply with follow-on messages and the messaging hub 100 can store the parameters of the conversation /thread including language processing, translation, assigned CSR, detected the origin (customer DID). These parameters allow the messaging hub 100 to expedite the processing of future messages in the conversation thread.

Figure 3:
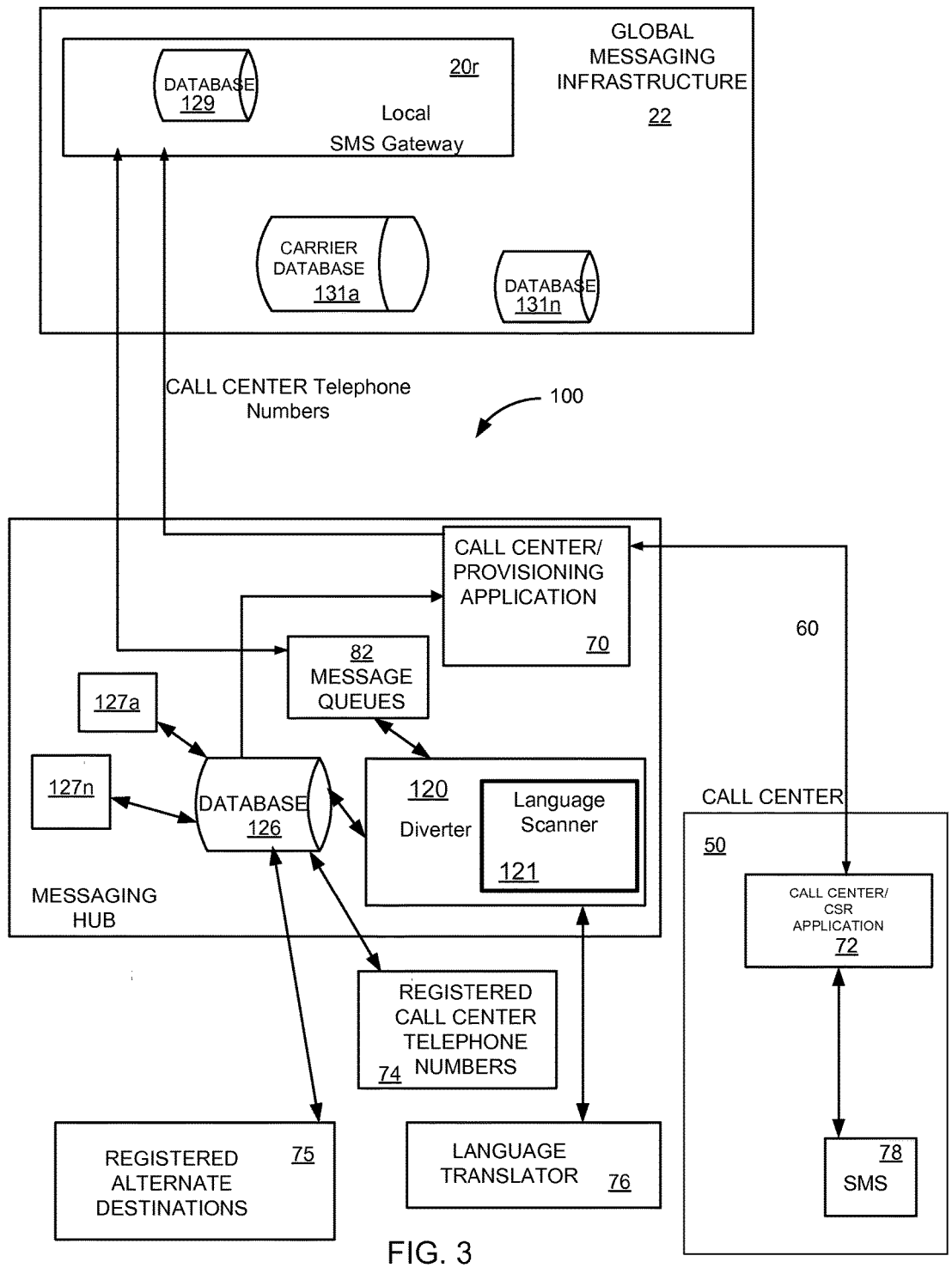
FIG. 3 illustrates further details of an embodiment of the messaging hub of FIG. 1.

FIG. 3 illustrates further details of the provisioning process and communication between the messaging hub 100 and the call center 50 and other alternate destination devices. The messaging hub 100 further includes a Hub call center application 70 which communicates with a corresponding call center/CSR application 72 in the call center 50 over the secure connection 60. The messaging hub 100 further includes a database 126 which is interfaced to the diverter 120 and stores language capabilities of various destinations within call center 50, registered call center telephone numbers 74, registered alternate destinations 75 (e.g., 8xx and DID telephone numbers) and associations between language capabilities and registered alternate destinations 75. The diverter 120 includes a language scanner 121 which is connected to a translator 76 and also includes or has access to a language database used for making language determinations.

During operational setup, a call center telephone number (or a block of numbers), origin identities, and numbers for some alternate destination devices are transferred to the messaging hub 100 and registered in the database 126. The call center telephone numbers, and numbers for some alternate destination devices are pushed or published into the database of the various directories, for example a carrier database 129 of the local SMS gateway 201 and/or industry databases 131*a*-131*n* of other SMS interfaces in the global messaging infrastructure 22. This allows replies from customers to be delivered to the messaging hub 100 for final delivery to the call center or other alternate destinations. The language capabilities of the enterprise are provisioned as described below in conjunction with step 410 in FIG. 4.

Provisioning of the call center telephone numbers (obtained from the call center 50 through call center application 72 (which receives an SMS message 78) or other means, and messaging hub call center application 70 in the messaging hub 100) and alternate destination devices into all the assorted databases, public and private, in the global messaging infrastructure 22 requires recognition and allowance by the mobile operators for mobile messages from non-mobile operator sources to flow through the network. This recognition and allowance is provided in advance of provisioning of call center telephone numbers. As a result of provisioning by the messaging hub 100, the call center telephone numbers reside and are registered in databases that are queried by the SMSC/MMSCs and other mobile industry elements.

Figure 4:
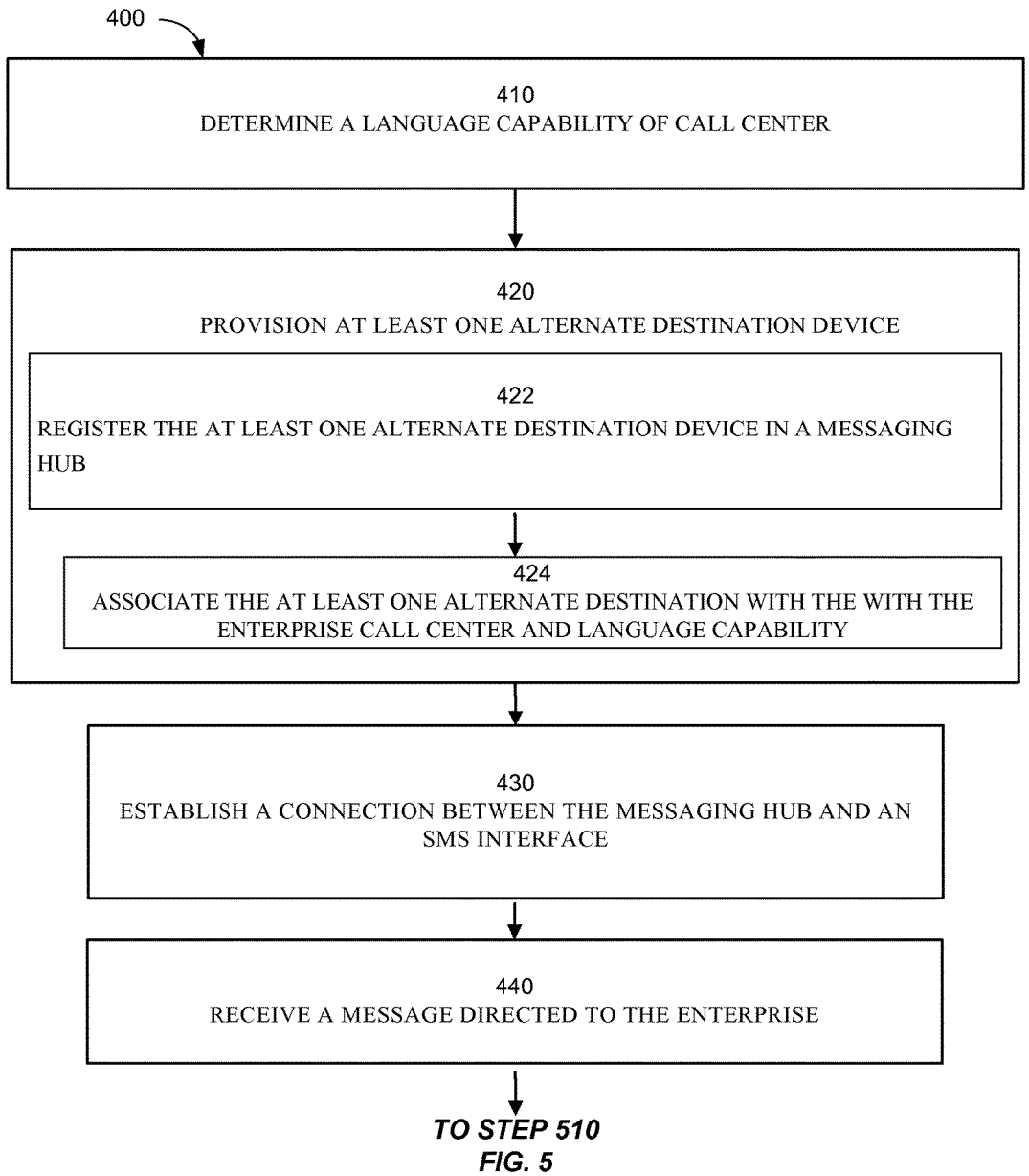
FIGS. 4-6 are flow charts of processing steps performed for provisioning call center telephone numbers and operation of the messaging hub in conjunction with the call center of FIG. 1.

In FIG. 4, flowchart 400 diagrams the overall process of converting an enterprise A2P messaging to a P2P messaging conversation. In step 410, a language capability of enterprise call center is determined. In one embodiment, the enterprise determines the language capabilities of a call center (e.g., a multi-lingual call center) or personnel in various departments and CSRs in the call centers and builds a database (or simply a table) associating these people with a language(s), connection information (e.g., a telephone number of a data enabled device, a call center CSR station number or the contact information for a language appropriate call center). This information can be communicated to the messaging hub 100 over the secure connection 60 using an application programming interface (API) or other means known in the art. In step 420, the alternate destination device is provisioned. The provisioning step 420 includes step 422, registering the alternate destination device in the messaging hub and step 424 associating the alternate destination with the enterprise call center and a language capability. When the alternate destination is a call center the call center telephone number(s) are provisioned for SMS communication. In one embodiment, the provisioning process includes provisioning the call center number including routing information into a carrier database directory.

In step 430, a secure connection is established between the messaging hub and the call center interface. In one embodiment, the alternate destination device is a call center interface which can connect to multiple devices for text messaging. In step 440, a message directed to the enterprise is received. Processing continues in step 510 described below.

Figure 5:
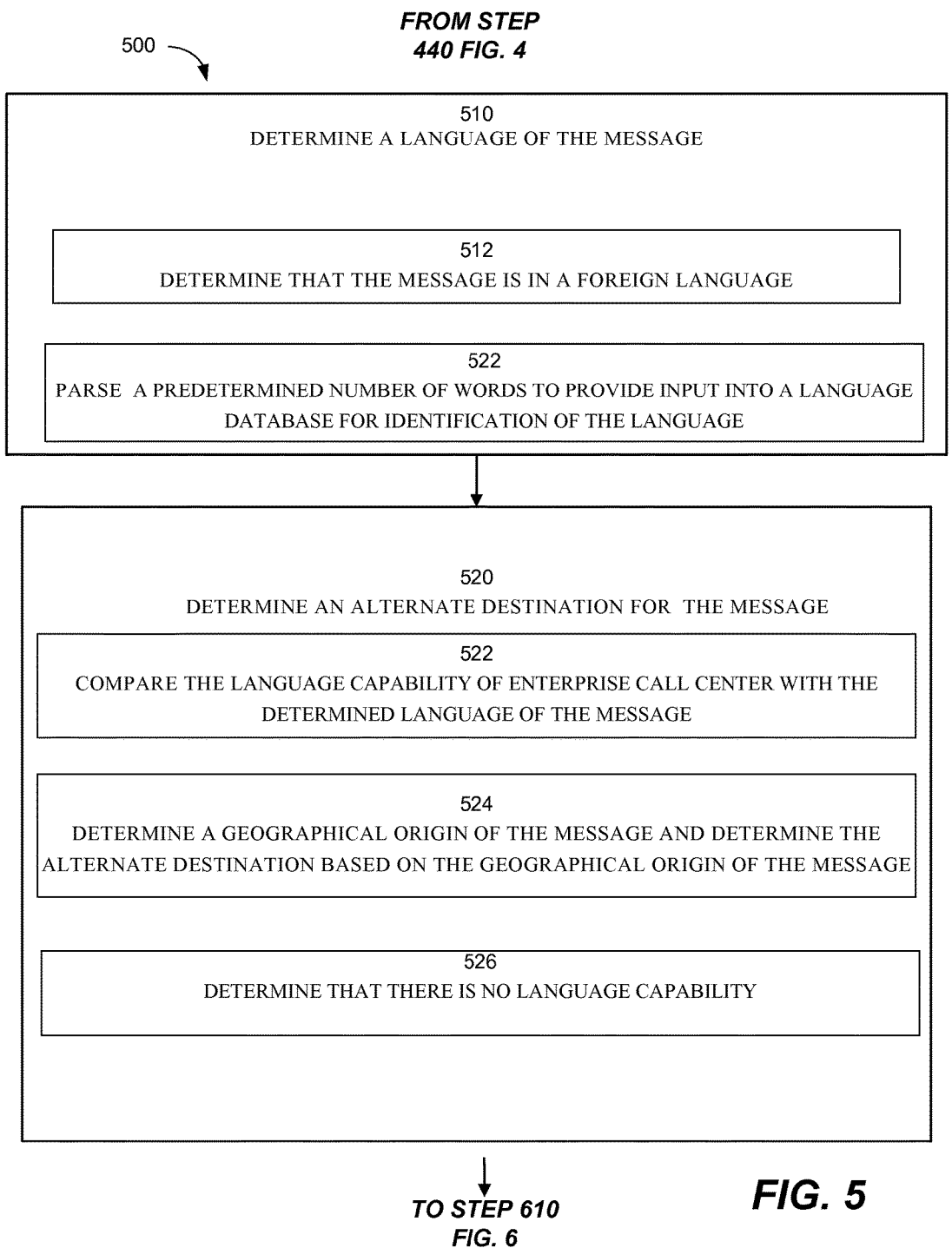

Now referring to In FIG. 5, flowchart 500 diagrams further details of determining an alternate destination for the message 148. In step 510, the language of the message is determined. Initially in step 512 it is determined whether the message is in a foreign language. This can be done in step 522 by parsing a predetermined number of words to provide input into a language database for identification of the language. If the message is determined to be in the native language of the call center, the message can be passed to the call center otherwise the foreign language needs to be identified. The language determination can be accomplished with the parsed words, additional parsed words, other automation techniques or if necessary with manual intervention. Another way of determining that the message is in a foreign language and identifying the language includes analyzing the character set of the text in the message.

In step 520 an alternate destination for the message is determined including in step 522 by comparing the language capability of the enterprise call center with the determined language of the message. Additional information can be used in determining an alternate destination for the message including determining a geographical origin of the message and determining an alternate destination for the message includes determining a geographical origin of the message and determining the alternate destination based on the geographical origin of the message. Additionally, parsed and translated key words such as 'complain,' buy,"return,"order' and 'change' can be used to select a department or specific call center representative as the alternate destination for the received message. Another technique for determining the alternate destination for the message in step 524 includes scanning the message, determining a geographical origin of the message Step 524 further includes determining the alternate destination based the geographical origin of the message. The geographical origin can also be used as an input in the language determination process.

In step 526, it is determined that there is no language capability to handle the message in the foreign language so the message must be translated if possible. In a further embodiment, the technique includes scanning the message, determining a source including telephone number of the message, accessing additional information about the source and determining an alternate destination based on the additional information. For example the enterprise might have information about a customer including a preferred language for messaging communication. This information could be supplied during customer registration or updated after a previous conversation where a language was associated with a corresponding telephone number.

Figure 6:
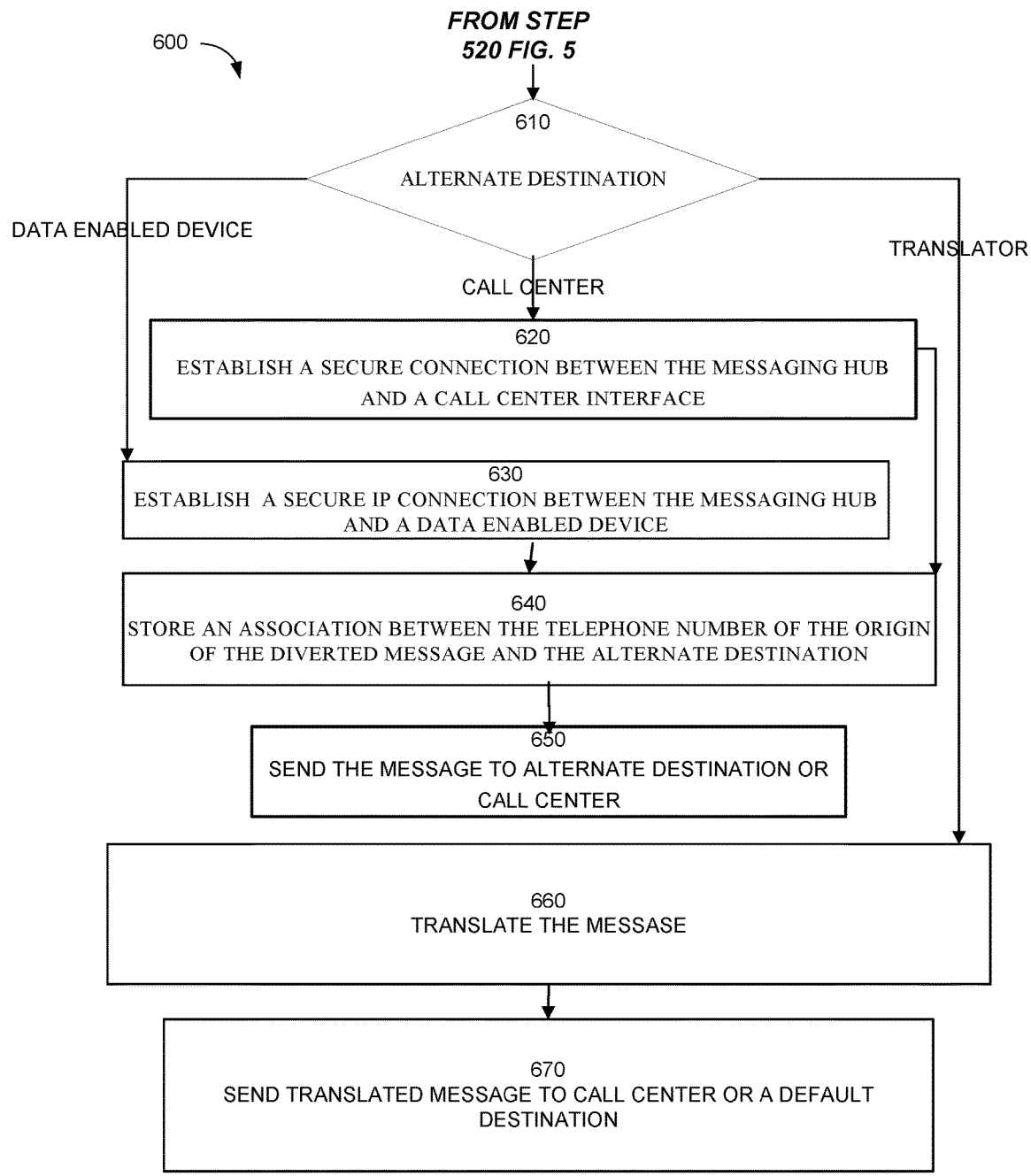

Now referring to In FIG. 6, flowchart 600 diagrams further details of processing the message after an alternate destination has been determined. In step 610, it is determined whether the alternate destination is a call center, a data enabled device or whether the message needs to be translated. If the alternate destination is a call center 50, a secure connection is established between the messaging hub 100 and the call center interface in step 620 and processing continues in step 640. In one embodiment, the call center interface can be an enterprise customer relationship management system of a call center. If the alternate destination is a data enabled device 26, a secure connection is established between the messaging hub 100 and the data enabled device 26 in step 630 and processing continues in step 640. If the message needs to be translated, it is sent to the translator and processing continues at step 660.

In step 640, an association between the telephone number of the origin of the diverted message and the alternate destination can be optionally stored. This allows the alternate destination to be reused to support further P2P conversations originating from a source (e.g., customer) whereby additional messages from the source can be diverted to a call center destination or a company department based on previous communications. In one embodiment, in step 650, the message is sent to the selected alternate destination or the call center 50. If the message is sent to the call center 50, the message can be directed to a specific CSR.

In another embodiment, in step 660, the message is translated and in step 670 the message is sent to the call center or other default destination. The message can be translated automatically or with manual (human translator) intervention.

Although the example and embodiments are described above with respect to SMS/MMS messaging, the present invention is not limited to SMS/MMS messaging. The methods disclosed herein can apply to other messaging environments as well as mixture of SMS/MMS with other messaging environments. Ongoing conversation threads can use a mixture of messaging environments. Alternatively, an entire conversation could include no SMS messaging. For example the conversation could occur entirely using Facebook Messenger, and switch between Facebook Messenger and more granular apps within Facebook Messenger.

While configurations of the system and method have been particularly shown and described with references to configurations thereof, it will be understood by those skilled in the art that various changes in form and details may be made therein without departing from the scope of the invention. As an example, the order of processing steps in the flow charts is not limited to the order shown herein. Accordingly, the present invention is not limited by the example configurations provided above.

What is claimed is:

1. A messaging hub for enterprise messaging comprising:
    a server connected to an SMS interface and a data enabled device;
    a database running on the server and storing:
        a registration of the data enabled device;
        a registration of an alternate destination;
        an association between the alternate destination and an enterprise call center;
        and a language capability of the enterprise call center;
    an incoming message queue storing one or more messages including a message directed to an enterprise; and
    a diverter directing the message to the data enabled device via a secure IP connection as the alternate destination for the message instead of the enterprise call center and sending the message to a default destination with an indication that a follow-on message requires special handling, the diverter further comprising:
        a message language scanner coupled to the incoming message queue and determining that the message is in a foreign language based on identifying a geographical origin of the message from a customer mobile phone sending the message,
    wherein:
        the alternate destination includes a language translator that translates the message;
        the indication that the follow-on message requires special handling is stored in the messaging hub; and
        the data enabled device is used by a call center employee and operates as a call center alternate destination.

2. The messaging hub of claim 1, wherein the diverter further includes a key word parser configured to:
    parse the message from the message queue to detect a key word extracted from the message; and
    determine the alternate destination based on the detected key word in the message, wherein the key word is related to at least one of:
        an enterprise call center department; and
        an enterprise call center representative.

3. The messaging hub for enterprise messaging of claim 2, wherein the key word parser includes a key word translator to translate key words related to corresponding enterprise departments.

4. The messaging hub of claim 1, wherein the special handling includes processing of the follow-on message by the messaging hub using at least one selected from the group consisting of:
    a customer origin number;
    an association parameter that associates the customer origin number with the alternate destination;
    a language processing parameter based on at least one of the determining;
    a language translation parameter based on the translating; and
    a customer service representative parameter based on a previously-assigned customer service representative.

5. The messaging hub of claim 1, wherein the data enabled device is one of:
    a mobile phone; and
    a smartphone, and
    wherein the message is a text message.

6. A non-transitory computer readable storage medium, comprising executable instructions, which when executed by a computer, cause the computer to:
    determine a language capability of an enterprise call center;
    provision an alternate destination device comprising:
        registering the alternate destination device in a messaging hub; and
        associating the alternate destination with the enterprise call center and a language capability;
    establish a connection between the messaging hub and a message interface;
    receive a message directed to an enterprise;
    determine the language of the message;
    determine an alternate destination for the message;
    determine that the message is in a foreign language compared to a language capability of the enterprise call center;
    identify the foreign language by determining a geographical origin of the message from a customer mobile phone sending the message;
    determine an alternate destination for the message instead of selecting the enterprise call center as the destination;
    divert the message to the alternate destination device, the alternate destination device including a language translator;
    translate the message by the language translator;
    send the message to a default destination;
    indicate, by the messaging hub, that a follow-on message requires special handling;
    store the indication in the messaging hub that the follow-on message requires special handling; and
    establish a secure IP connection between the messaging hub and a data enabled device,
    wherein the diverted alternate destination is the data enabled device, which is used by a call center employee and operates as a call center alternate destination.

7. The non-transitory computer readable storage medium of claim 6, further comprising executable instructions to:

parse the message to detect a key word related to one of:
an enterprise call center department; and
an enterprise call center representative,
wherein determining the alternate destination is based on the detected key word in the message.

8. The non-transitory computer readable storage medium of claim 6, wherein the special handling includes processing of the follow-on message by the messaging hub using at least one selected from the group consisting of:
a customer origin number;
an association parameter that associates the customer origin number with the alternate destination;
a language processing parameter based on at least one of the determining;
a language translation parameter based on the translating; and
a customer service representative parameter based on a previously-assigned customer service representative.

9. The non-transitory computer readable storage medium of claim 6, wherein the data enabled device is one of:
a mobile phone; and
a smartphone, and
wherein the message is a text message.

10. A computer-implemented method for enterprise messaging, the method comprising:
determining a language capability of an enterprise call center;
provisioning an alternate destination comprising:
registering the alternate destination in a messaging hub; and
associating the alternate destination with the enterprise call center and a language capability;
establishing a connection between the messaging hub and a message interface;
receiving a message directed to an enterprise;
determining the language of the message;
determining that the message is in a foreign language compared to a language capability of the enterprise call center;
identifying the foreign language by determining a geographical origin of the message from a customer mobile phone sending the message;
determining an alternate destination for the message instead of selecting the enterprise call center as the destination;
diverting the message to the alternate destination, the alternate destination including a language translator;
translating the message by the language translator;
sending the message to a default destination;
indicating, by the messaging hub, that a follow-on message requires special handling;
storing the indication, in the messaging hub, that the follow-on message requires special handling; and
establishing a secure IP connection between the messaging hub and a data enabled device,
wherein the diverted alternate destination is the data enabled device, which is used by a call center employee and operates as a call center alternate destination.

11. The method of claim 10, wherein the data enabled device is one of:
a mobile phone; and
a smartphone, and
wherein the message is a text message.

12. The method of claim 10, wherein the special handling includes processing of the follow-on message by the messaging hub using at least one selected from the group consisting of:
a customer origin number;
an association parameter that associates the customer origin number with the alternate destination;
a language processing parameter based on at least one of the determining;
a language translation parameter based on the translating; and
a customer service representative parameter based on a previously-assigned customer service representative.

13. The method of claim 10, wherein the data enabled device is one of:
a mobile phone; and
a smartphone, and
wherein the message is a text message.

* * * * *